3,146,948
FLUID CONTROL APPARATUS
James T. Payne, Sudbury, Mass., assignor to Standard-Thomson Corporation, Waltham, Mass., a corporation of Delaware
Filed Sept. 20, 1962, Ser. No. 225,075
4 Claims. (Cl. 236—93)

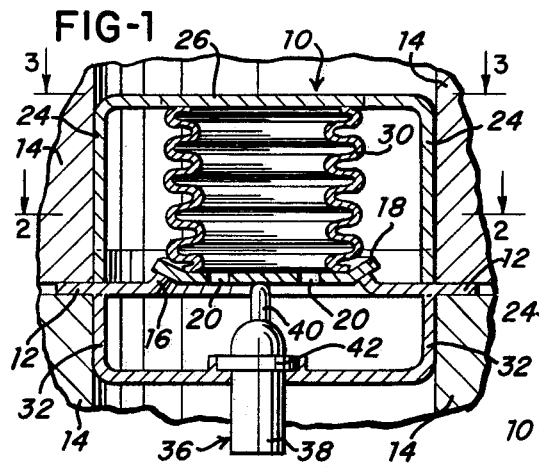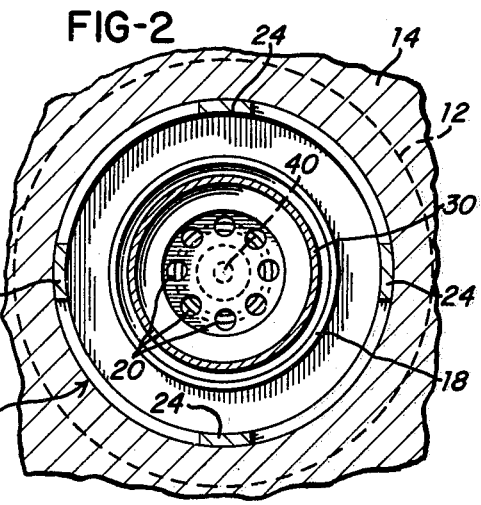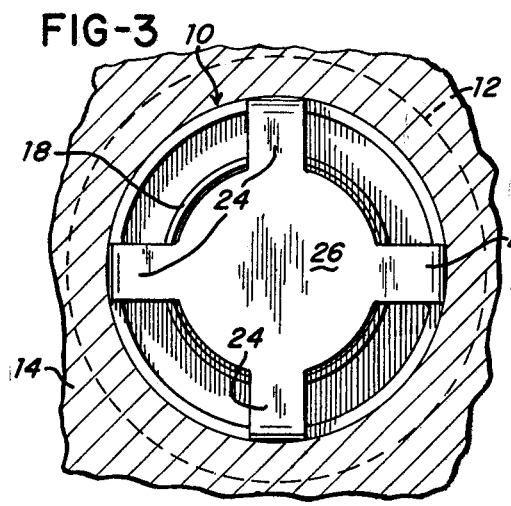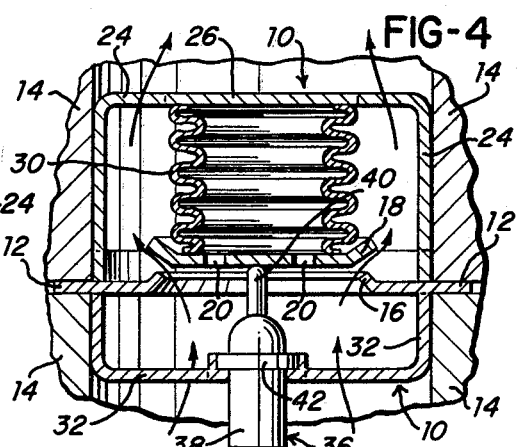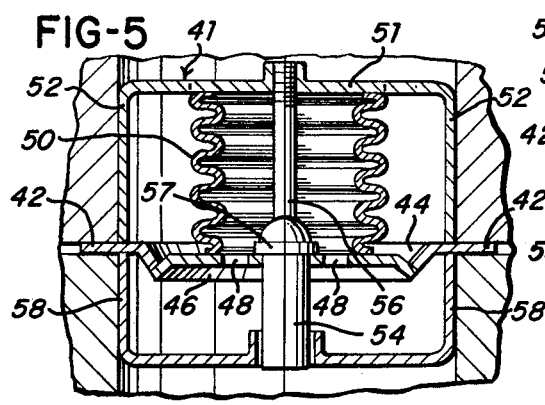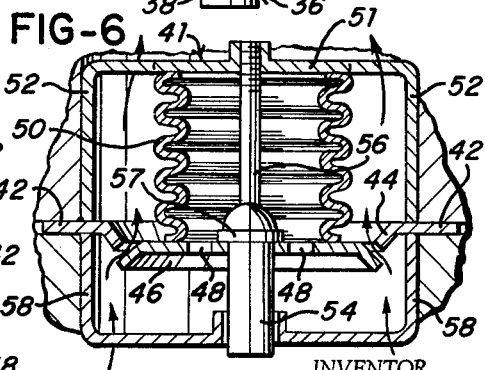
INVENTOR.
JAMES T. PAYNE
BY William R Jacox
ATTORNEY

United States Patent Office 3,146,948
Patented Sept. 1, 1964

This invention relates to fluid control apparatus.

The invention relates more particularly to thermally responsive fluid control apparatus. However, the invention is not so limited.

An object of this invention is to provide fluid control apparatus which operates without influence by differential pressures or in which the influence of differential pressures may be controlled.

It is another object of this invention to provide fluid control apparatus which operates without appreciable influence by ambient fluid pressures.

Another object of this invention is to provide thermally responsive valve apparatus in which values of cycling of a closure member are small or negligible.

Another object of this invention is to provide such valve apparatus in which entrapment of foreign material is negligible.

Another object of this invention is to provide such thermally responsive valve apparatus in which work required of actuator means thereof may be comparatively low in value, the actuator means thus having long life and good reliability.

Another object of this invention is to provide such apparatus which can be produced at relatively low costs and which is long-lived.

Other objects and advantages reside in the construction of parts, the combination thereof, the method of manufacture, and the mode of operation, as will become more apparent from the following description.

In the drawing:

FIGURE 1 is a sectional view of fluid control apparatus of this invention.

FIGURE 2 is a sectional view taken substantially on line 2—2 of FIGURE 1.

FIGURE 3 is a sectional view taken substantially on line 3—3 of FIGURE 1.

FIGURE 4 is a sectional view similar to FIGURE 1 but showing the members of the apparatus in a position of operation.

FIGURE 5 is a sectional view of a modification of the fluid control apparatus of this invention.

FIGURE 6 is a sectional view similar to FIGURE 5 but showing the members of the apparatus in a position of operation.

Referring to the drawing in detail, apparatus of this invention as shown in FIGURES 1-4 includes support structure or frame structure 10 provided with a mounting flange 12 which is adapted to be retained between two housing members or conduit members 14. The members 14 form a portion of a fluid conduit within which the apparatus of this invention is disposed for control of fluid therethrough.

The support structure 10 also includes an annular valve seat portion 16 which forms a fluid port therethrough.

A movable closure member 18 is adapted to engage the valve seat 16. The closure member 18 has one or more openings 20 therethrough.

The support structure 10 includes a plurality of legs 24 which extend from the flange 12. The legs 24 carry a rigid wall member 26 which may be integral therewith. Secured to the rigid wall member 26 is an elongate annular wall 30 which is expansible and contractible in length. The rigid wall 26 closes the upper end of the annular elongate wall 30, as shown in FIGURES 1, 3, and 4. If desired the wall 26 may be integral with the annular wall 30. The annular elongate wall 30 is shown as being of semi-rigid flexible or foldable material such as bellows material or the like. Preferably, the elongate annular wall 30 has an inherent or natural resiliency such that the wall 30 urges the closure member 18 toward the valve seat 16. However, other resilient means may be used for urging the closure member 18 toward the valve seat 16.

The lower end of the elongate wall 30 is integral with or attached to the closure member 18 and encompasses the openings 20. Thus, a chamber is formed into which fluid may flow and from which fluid may flow through the openings 20.

The support structure or frame structure 10 includes a plurality of arms 32 which extend from the flange 12 in a direction opposite from the legs 24. The arms 32 carry a thermally responsive actuator device 36 which may be of any known type. Preferably, the actuator device 36 is of a pressure insensitive type. The actuator device 36 may be similar to that shown in Patent No. 2,806,375 or Patent No. 2,806,376. The actuator device 36 includes a container 38 which has thermally responsive expansible-contractible material therein (not shown). An actuator rod 40 has a portion within the container 38 and extends therefrom and is axially movable with respect thereto. Thus, there is relative movement between the container 38 and the actuator rod 40 upon expansion of the thermally responsive material within the container 38. The container 38 is shown as having a flange 42 in engagement with the arms 32. The actuator rod 40 is adapted to engage the closure member 18 for movement thereof in a direction from the valve seat 16.

*Operation*

As shown, the fluid control apparatus is disposed within the conduit formed by the members 14 so that the arms 32 are on the upstream side or inlet side of the apparatus. The legs 24 are on the downstream side or outlet side of the apparatus.

The closure member 18 is normally in engagement with the valve seat 16. Thus, fluid cannot normally flow through the fluid port formed by the valve seat 16. However, as stated above, fluid may flow through the openings 20 into and out of the chamber formed by the walls 30 and 26. Thus, the fluid pressure on one side of the closure member 18 is equal to the fluid pressure on the opposite side thereof. The area of the closure member 18 encompassed by the wall 30 on the outlet side of the closure member 18 may be substantially equal to the area of the closure member 18 engaged by fluid on the inlet side of the closure member 18. Therefore, the total pressure on one side surface of the closure member 18 may be substantially equal to the total pressure on the opposite side surface thereof. Thus, the pressure of the fluid controlled by the fluid control apparatus has little or no appreciable effect upon movement of the closure member 18.

As stated above, a small quantity of fluid flows through the openings 20 into the chamber formed by the walls 30 and 26. Otherwise there is no fluid which flows in the conduit from the upstream side of the fluid control apparatus to the downstream side thereof when the closure member 18 is in engagement with the valve seat 16, as shown in FIGURE 1.

The thermally responsive actuator 36 is on the inlet side of the apparatus and is engaged by fluid. Until the temperature of the fluid reaches a given value, the volume of the thermally responsive expansible-contractible material within the container 38 is insufficient to cause relative movement between the actuator rod 40 and the container 38. Thus, the closure member 18 remains in engagement with the valve seat 16. Thus, fluid does not flow through the apparatus.

When the temperature of the fluid which engages the container 38 becomes a certain predetermined value, there is sufficient expansion of the thermally responsive material therewithin to cause relative movement between the actuator rod 40 and the container 38. Due to the fact that the container 38 is carried by the fixed arms 32, the container 38 does not move. However, the rod 40 moves in a direction from the container 38 and forces the closure member 18 in a direction away from the valve seat 16, as shown in FIGURE 4. Thus, fluid flows from the inlet side of the apparatus to the outlet side thereof in the manner illustrated by arrows in FIGURE 4. Such movement of the closure member 18 is against the natural resilient forces of the annular elongate wall 30.

When the temperature of the fluid engaging the container 38 decreases, the volume of the material within the container 38 decreases. Then the resilient action of the annular elongate wall 30 is capable of forcing the closure member 18 toward the valve seat 16. The resilient action of the wall 30 upon the closure member 18 also forces the actuator rod 40 to move farther within the container 38. Upon sufficient cooling and contraction of the material within the container 38, the closure member 18 and the actuator rod 40 are moved by the resilient forces of the annular wall member 30 to their normal deactuated positions shown in FIGURE 1.

*FIGURES 5 and 6*

Fluid control apparatus of this invention as shown in FIGURES 5 and 6 comprises support structure 41 provided with a mounting flange 42 and having an annular valve seat 44 forming a fluid port therethrough. A movable closure member 46 is normally in engagement with the valve seat 44. The movable closure member 46 has one or more openings 48 therethrough.

An elongate annular wall member 50 is expansible and contractible in length and is shown as being a flexible member of a bellows type. The upper end of the wall 50 is closed by a rigid wall 51 which may be attached integrally or otherwise to leg members 52 which extend from the flange 42.

The lower end of the expansible-contractible wall 50 is secured to or integral with the closure member 46 and encompasses the openings 48. Preferably, the elongate flexible expansible-contractible wall 50 has an inherent or natural tensional resiliency which urges the closure member 46 toward the valve seat 44. However, other means may be used for urging the closure member 46 toward the valve seat 44. A chamber is thus formed into which fluid may flow and from which fluid may flow through the openings 48 of the closure member 46.

A container 54, which may be similar to the container 38, has thermally responsive expansible-contractible material therein which is operable upon an actuator rod 56 to cause relative movement between the rod 56 and the container 54. The rod 55 extends within the elongate wall 50 and is shown attached to the wall 51.

The container 54 is carried by the closure member 46 and is loosely encompassed by a guide ring 57 which is carried by leg members 58 which extend from the flange 42.

As stated above, the openings 48 which extend through the closure member 46 permit flow of fluid into the chamber formed by the walls 50 and 51. Thus, the per unit area fluid pressure on the opposed sides of the closure member 46 is substantially the same. The area of the closure member 46 encompassed by the wall 50 may be substantially equal to or only slightly less than the area on the opposite side of the closure member 46. Thus, the total pressure on one surface of the closure member may be substantially equal to or nearly equal to the total pressure on the opposite surface thereof. Thus, the pressure of the fluid controlled by the apparatus does not appreciably affect movement of the closure member 46.

When the fluid engaging the container 54 reaches a certain predetermined temperature, there is relative movement between the rod 56 and the container 54. Due to the fact that the rod 56 is attached to the wall 51 the container moves. Movement of the container 54 causes movement of the closure member 46, as shown in FIGURE 6. Thus, there is flow of fluid through the apparatus, as illustrated by arrows in FIGURE 6.

Thus, it is understood that fluid control apparatus of this invention permits accurate control of fluid flow in accordance with the temperature thereof. The pressure of the fluid controlled does not appreciably affect operation of the apparatus. Thus, a valve may be produced according to this invention in which a movable closure member may have any degree of pressure balance.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Fluid control structure comprising:

support structure having a valve seat forming a fluid port having an inlet side and an outlet side, a closure member engageable with the valve seat on the inlet side of the fluid port, the closure member being movable with respect to the valve seat, an elongate annular wall member expansible and contractible in length, the wall member having a closed end carried by the support structure on the outlet side of the fluid port and spaced from the valve seat, the other end of the elongate annular wall member being attached to the closure member, the closure member having an opening therethrough so that fluid may flow therethrough, the opening being in communication with the inside portion of the annular wall member, the elongate annular wall member having a natural resiliency urging the closure member toward the valve seat, thermally responsive actuator means having an extensible portion within the elongate wall member and attached to the support structure at a position spaced from the valve seat, the thermally responsive actuator means also having a rigid container portion carried by the closure member, the extensible portion and the container portion of the actuator means being relatively movable so that operation of the actuator means causes the rigid container to move in a direction away from the valve seat so that the closure member is moved in a direction away from the valve seat.

2. Fluid control apparatus comprising:

support structure provided with a valve seat member forming a fluid port having an upstream side and a downstream side, a cup-shaped member having flexible side walls so that the cup-shaped member has a variable length, the cup-shaped member having a closed end wall which is attached to the support structure, a closure member attached to the cup-shaped member at the end thereof opposite said closed end wall, the closure member being engageable with the valve seat member on the upstream side of the fluid port, the closure member being movable with respect to the valve seat member, the flexible side walls of the cup-shaped member changing in length with movement of the closure member with respect to the valve seat member, the closure member having an opening therethrough so that fluid may flow therethrough, the opening communicating with the inside portion of the cup-shaped member, thermally responsive actuator means having a sensing portion at the upstream side of the fluid port, the thermally responsive means having a portion extending through the cup-shaped member and joined to the closed end wall thereof, the thermally responsive means having a portion thereof engageable with the closure member for movement thereof in a direction away from the valve seat member, the cup-shaped member extending in length as the closure member moves away from the valve seat member.

3. Fluid control apparatus comprising:

valve seat structure forming a fluid port having an upstream side and a downstream side, a cup-shaped member having flexible side walls so that the cup-shaped member is variable in length, the cup-shaped member having a closed end wall which is fixed in position with respect to the valve seat structure, a closure member carried by the cup-shaped member at the end thereof opposite said closed end wall, the closure member being engageable with the valve seat structure, the closure member being movable with respect to the valve seat member, the cup-shaped member changing in length with movement of the closure member in a direction from the valve seat structure, the closure member having an opening therethrough so that fluid may flow therethrough, the opening communicating with the inside portion of the cup-shaped member, a thermally responsive actuator device having a portion in engagement with the closure member, there being a portion of the thermally responsive actuator device fixed in position with respect to the valve seat structure, the thermally responsive actuator device thus being operable to move the closure member in a direction from the valve seat member in the upstream direction from the fluid port.

4. The apparatus of claim 3 in which the flexible side walls of the cup-shaped member are of resilient material which provide resilient forces urging the closure member toward the valve seat structure and in which the resilient forces of the flexible side walls are such with respect to the area of the closure member engaged by fluid that such resilient forces are overcome by excessive fluid pressures upon the closure member urging the closure member away from the valve seat structure so that the apparatus has fail safe characteristics.

References Cited in the file of this patent
UNITED STATES PATENTS

| | | |
|---|---|---|
| 2,082,471 | Tallmadge | June 1, 1937 |
| 3,009,678 | Soderberg et al. | Nov. 21, 1961 |
| 3,047,055 | Kimm | July 31, 1962 |